United States Patent [19]

Shell et al.

[11] Patent Number: 5,238,220
[45] Date of Patent: Aug. 24, 1993

[54] MANUALLY AND ELECTRICALLY CONTROLLED BUTTERFLY VALVE

[75] Inventors: Sidney D. Shell, Lynnwood; Dung T. Vu, Edmonds, both of Wash.

[73] Assignee: The Boeing Company, Seattle, Wash.

[21] Appl. No.: 728,430

[22] Filed: Jul. 11, 1991

Related U.S. Application Data

[63] Continuation-in-part of Ser. No. 562,503, Aug. 2, 1990, abandoned.

[51] Int. Cl.[5] .................. F16K 31/44; F16K 31/04
[52] U.S. Cl. ..................................... 251/67; 251/68; 251/294; 251/305; 454/257
[58] Field of Search ............... 251/14, 67, 68, 294, 251/305, 70, 129.03; 74/500.5; 137/75; 454/256, 257, 333, 369

[56] References Cited

U.S. PATENT DOCUMENTS

| | | | |
|---|---|---|---|
| 1,897,000 | 2/1933 | Biery | 251/68 |
| 1,898,821 | 2/1933 | Ewald | 454/369 |
| 1,910,744 | 5/1933 | Brinkman | 251/68 |
| 1,919,625 | 7/1933 | Ewald | 454/333 |
| 2,116,911 | 5/1938 | Richardson | 251/68 |
| 2,322,639 | 6/1943 | Kuhles | 251/68 |
| 2,382,720 | 8/1945 | Hopkins | 251/68 |
| 2,604,115 | 7/1952 | Munson | 251/294 |
| 2,802,553 | 8/1957 | Roggenstein et al. | 251/68 |
| 2,952,402 | 9/1960 | Morrison et al. | 251/68 |
| 3,006,196 | 10/1961 | Brackett | 251/68 |
| 3,830,016 | 8/1974 | Levine | 454/369 |
| 3,955,792 | 5/1976 | Cho | 251/294 |
| 4,263,930 | 4/1981 | McCabe | 454/369 |
| 4,295,486 | 10/1981 | McCabe | 454/257 |
| 4,625,626 | 12/1986 | Aalto et al. | 454/369 |
| 4,648,310 | 3/1987 | Westcoat et al. | 454/333 |

Primary Examiner—George L. Walton
Attorney, Agent, or Firm—Conrad O. Gardner; B. A. Donahue

[57] ABSTRACT

A butterfly valve is utilized to control air flow in the environmental control air distribution system of an aircraft. A linkage system enables the valve to be manually controlled under normal conditions but to be shut off remotely in case of an emergency condition.

4 Claims, 5 Drawing Sheets

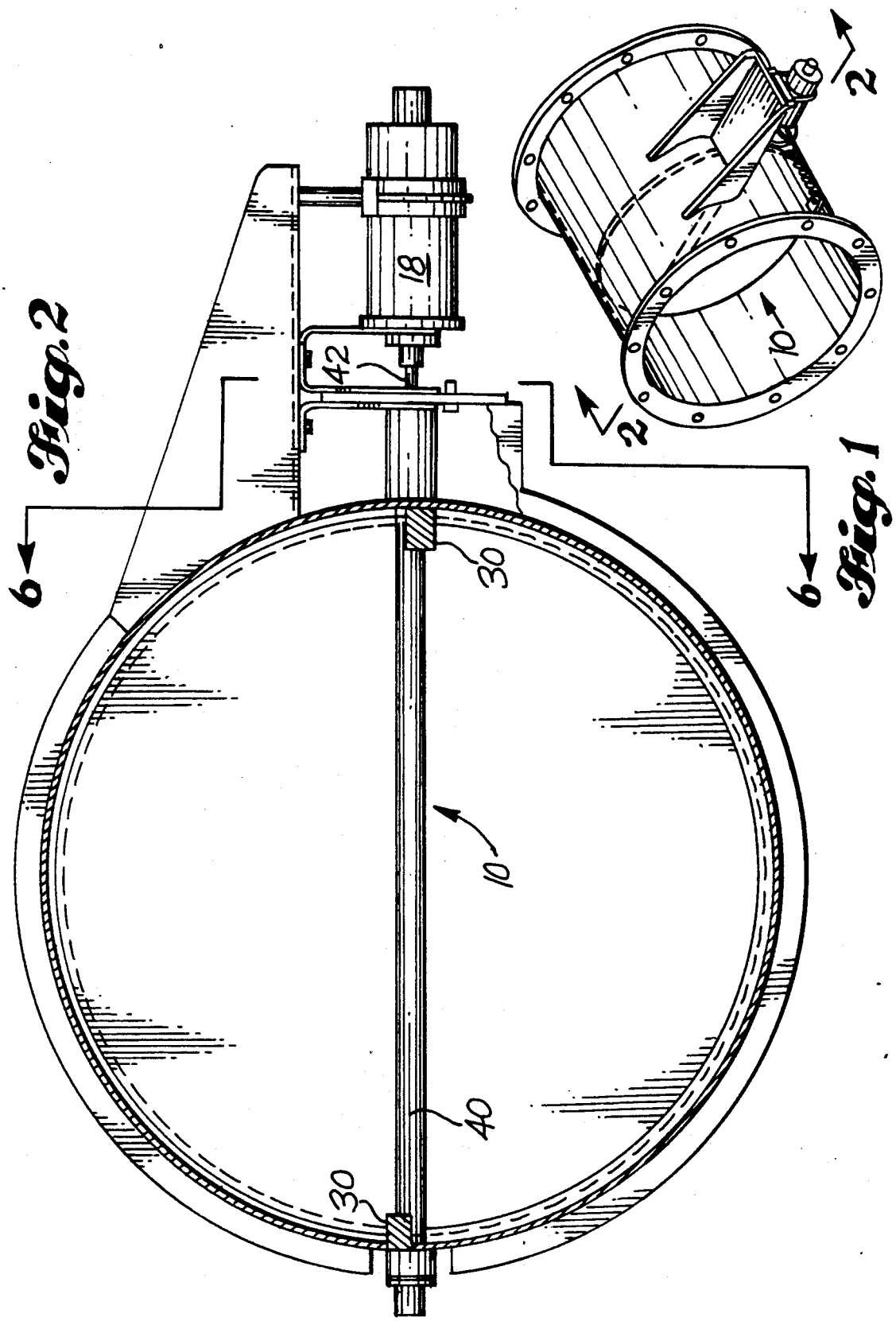

MANUALLY AND ELECTRICALLY CONTROLLED BUTTERFLY VALVE

CROSS REFERENCE TO RELATED APPLICATIONS

This application is a continuation in part of Ser. No. 07/562,503 filed on Aug. 2, 1990, now abandoned.

BACKGROUND OF THE INVENTION

Automatic shift of valve operation from open to closed position has been known in the prior art e.g. as shown in U.S. Pat. No. 1,014,669 wherein a field magnet circuit is employed to release a lever to permit contraction of a spring for automatic shift of a stop valve from open to closed position.

A valve having a torque shaft with solenoid and valve actuating members arranged for mounting operatively upon the torque shaft of the valve to control same is shown in U.S. Pat. No. 2,382,720.

Closure of valves by mechanical means between open and closed positions and wherein by the use of electrical energy the closure can be released from its mechanical operator and be moved as by spring pressure to closed position is known in the prior art as exemplified by U.S. Pat. No. 3,134,271.

Maintaining valves in the open position by restricting the valve control rod, cable, or handle, and removing restriction of the valve control rod, cable, or handle by solenoid to permit closure is known in prior art as exemplified by U.S. Pat. Nos. 2,802,553, 2,604,115, and 1,897,000 respectively.

SUMMARY OF THE INVENTION

This invention relates to a butterfly valve utilized in an air distribution system which is manually controlled by cable means and wherein there is provided a clevis locking mechanism and spring means which normally retain the cable in operative condition. In addition, means for limiting rotation of the valve is provided by the butterfly valve shaft bushing. Also operatively associated with the present manually and electrically controlled butterfly valve is an electrical solenoid having a pin which is withdrawn from the clevis locking mechanism in case of an emergency condition e.g. a fire so that the cable is released. The spring and/or air pressure then closes the butterfly valve.

BRIEF DESCRIPTION OF THE DRAWINGS

This invention may be more clearly defined with reference to the accompanying drawings in which:

FIG. 1 is a perspective view of the present manually and electrically controlled butterfly valve assembly for controlling air flow in a duct;

FIG. 2 is an end elevation view with duct in section taken along line 2—2 of FIG. 1;

DESCRIPTION OF THE PREFERRED EMBODIMENT

Figure 3:
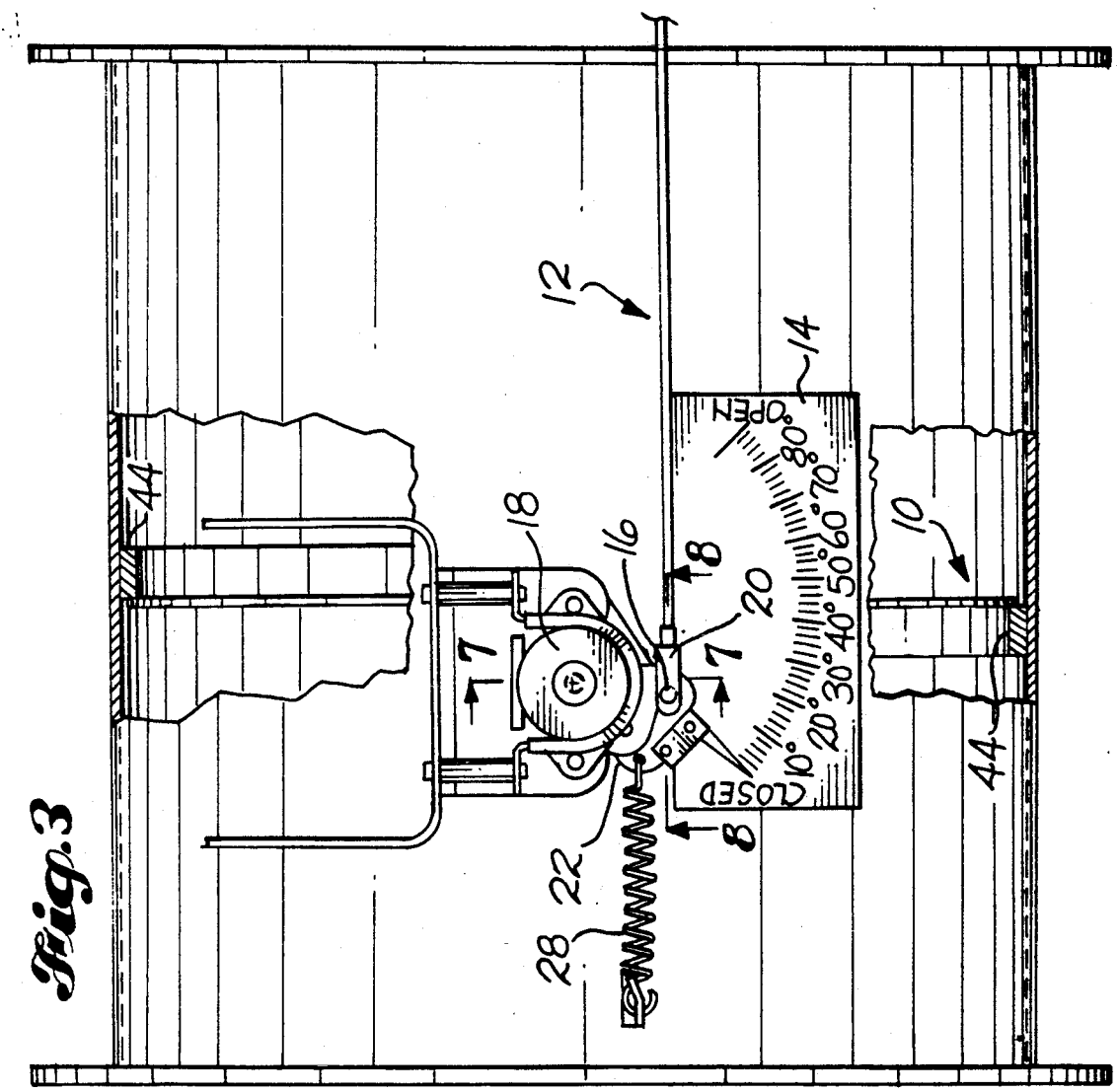
FIG. 3 is a side elevation of the duct of FIGS. 1 and 2 showing in detail the solenoid, clevis locking mechanism and associated operating elements of the present manually and electrically controlled butterfly valve with butterfly valve in the closed position prepared for manual operation.

In the Figures, linkages are utilized which enable a butterfly valve 10 to be controlled manually by a push-pull cable 12. Push-pull cable 12 can set butterfly valve 10 to any position between fully open and fully closed when such motion is applied by a operator as shown by the directional arrows adjacent the numeral 12 in FIG. 4. Indicator 14 as shown in FIG. 3 provides a measure of the opening in degrees. The linkage and spring means associated with butterfly valve 10 are operative to close butterfly valve 10 when solenoid 18 controlled solenoid pin 42 is withdrawn.

Figure 4:
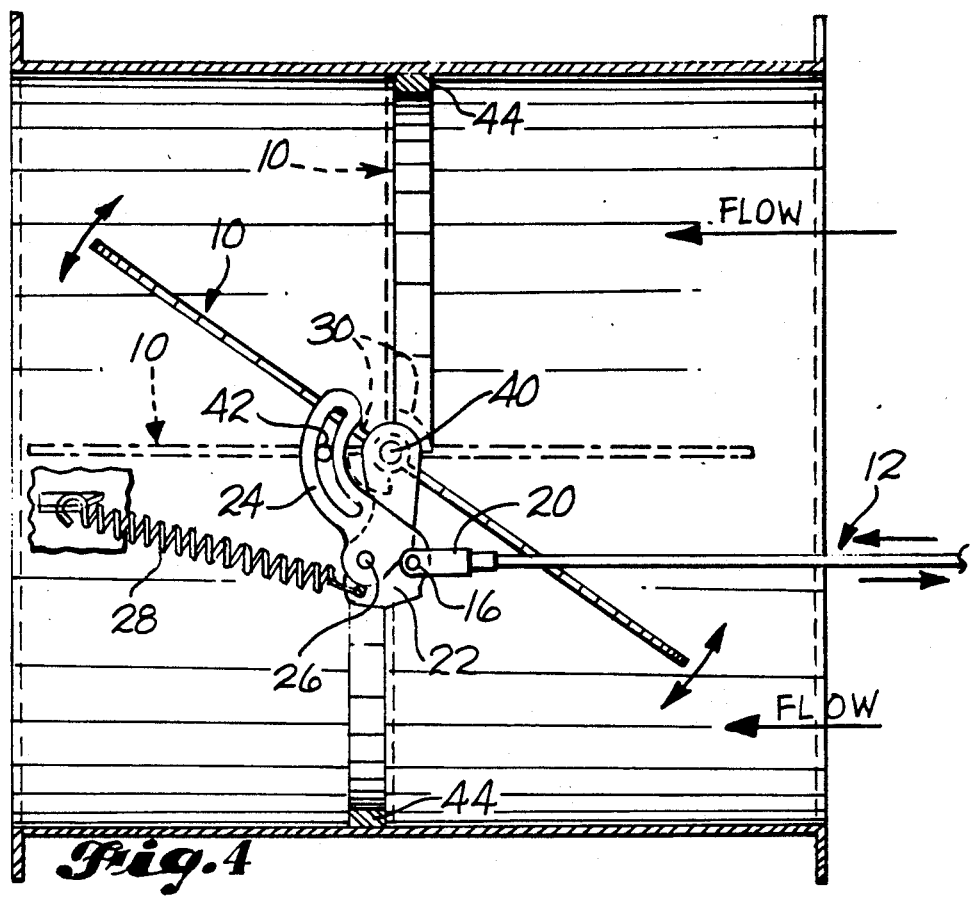
FIG. 4 is another side elevational view of the duct of FIGS. 1 and 2 showing the butterfly valve in a partially opened condition under manual cable push or pull control by an operator (not shown).
Figure 5:
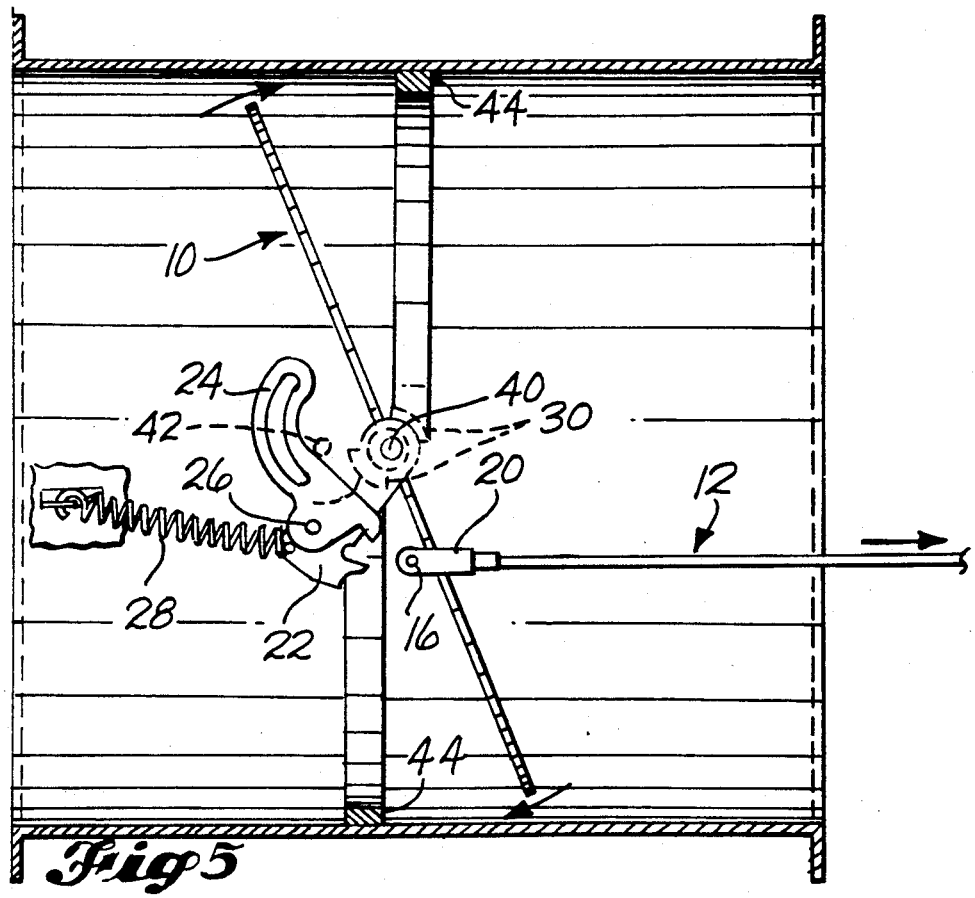
FIG. 5 is another side elevational view of the duct of FIGS. 1 and 2 showing release of cable clevis after withdrawal of the solenoid pin resulting in motion to close the butterfly valve under spring and airflow influence.
Figure 6:
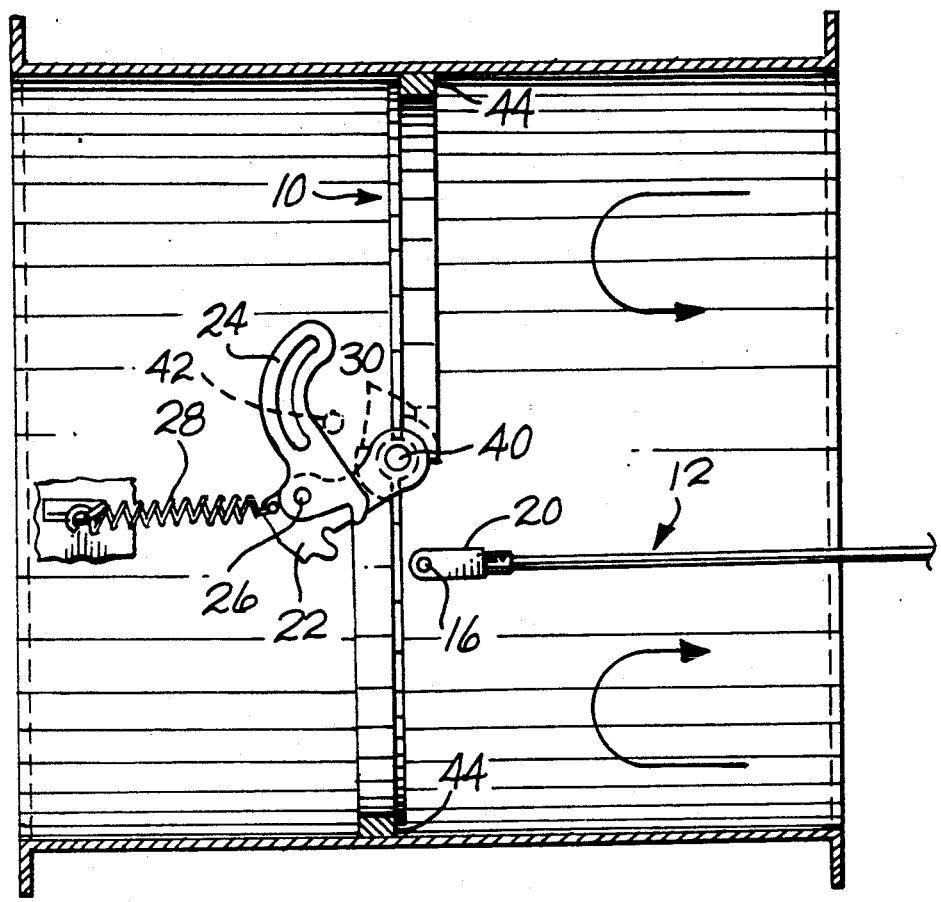
FIG. 6 is another side elevational view of the duct of FIGS. 1 and 2 showing the emergency position of the butterfly valve stopped by the valve shaft bushing.
Figure 7:
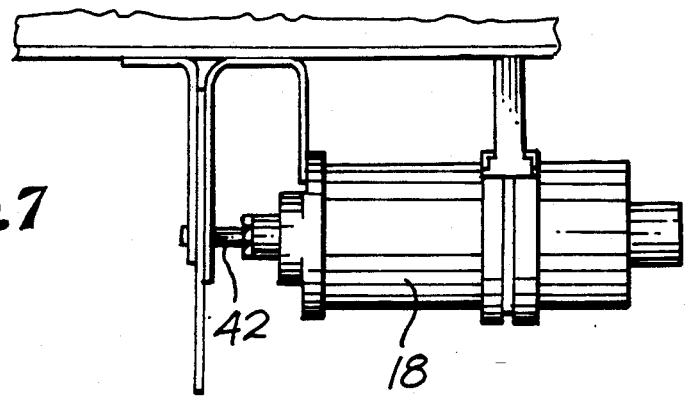
FIG. 7 is a top view taken along line 7—7 of FIG. 3 of solenoid prior to solenoid pin release.
Figure 8:
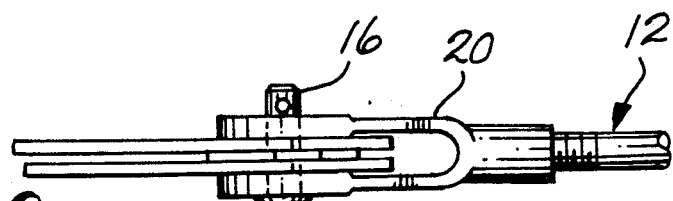
FIG. 8 is a top view taken along line 8—8 of FIG. 3 of the pivot pin prior to release of the cable clevis.

Upon withdrawal of solenoid pin 42 (shown in FIG. 4), clevis locking link 24 rotates about pivot pin 26 which movement releases cable clevis pin 16 and disengages cable clevis 20 as shown in FIGS. 5 and 6, thus terminating manual control of butterfly valve 10 and allowing spring 28 under tension to rotate locking lever 22 about shaft 40, said lever 22 being pivotably connected to butterfly valve 10, such that spring 28 and/or the air pressure on the butterfly valve 10 flapper, as denoted by the arrows labeled flow in FIG. 4, close butterfly valve 10 against stopping means 30. Such stopping mean 30 acts as the butterfly valve shaft 40 bushing.

Clevis locking link 24 as seen previously is utilized to keep push pull cable clevis 2 and lever 22 together until release of solenoid pin 42 whereby motion of the flapper of butterfly valve 10 commences in rotation (as shown in the direction of the arrows of FIG. 5) about shaft 40 of butterfly valve 10 until a fully closed (emergency shut-off) position is achieved in FIG. 6. Seal 44 prevents airflow around butterfly valve 10 in closed position as shown in FIG. 6. Energization of electrical solenoid 18 to withdraw solenoid pin 42 thereby disablinq manual control of butterfly valve 10 may be by any electrical signal representative of some condition such as detection of a fire condition.

In the tests when the solenoid on the valve linkage mechanism was activated, the mechanism immediately disengaged and butterfly valve 10 shut off as expected. The air pressure tends to close butterfly valve 10 for all angles above three degrees from fully open position. The valve flapper can thus be set at three degrees from fully open position. These tests determined the spring 28 size required to stabilize the linkage mechanism and cable flapper for air turbulence and vibration events.

Figure 10:
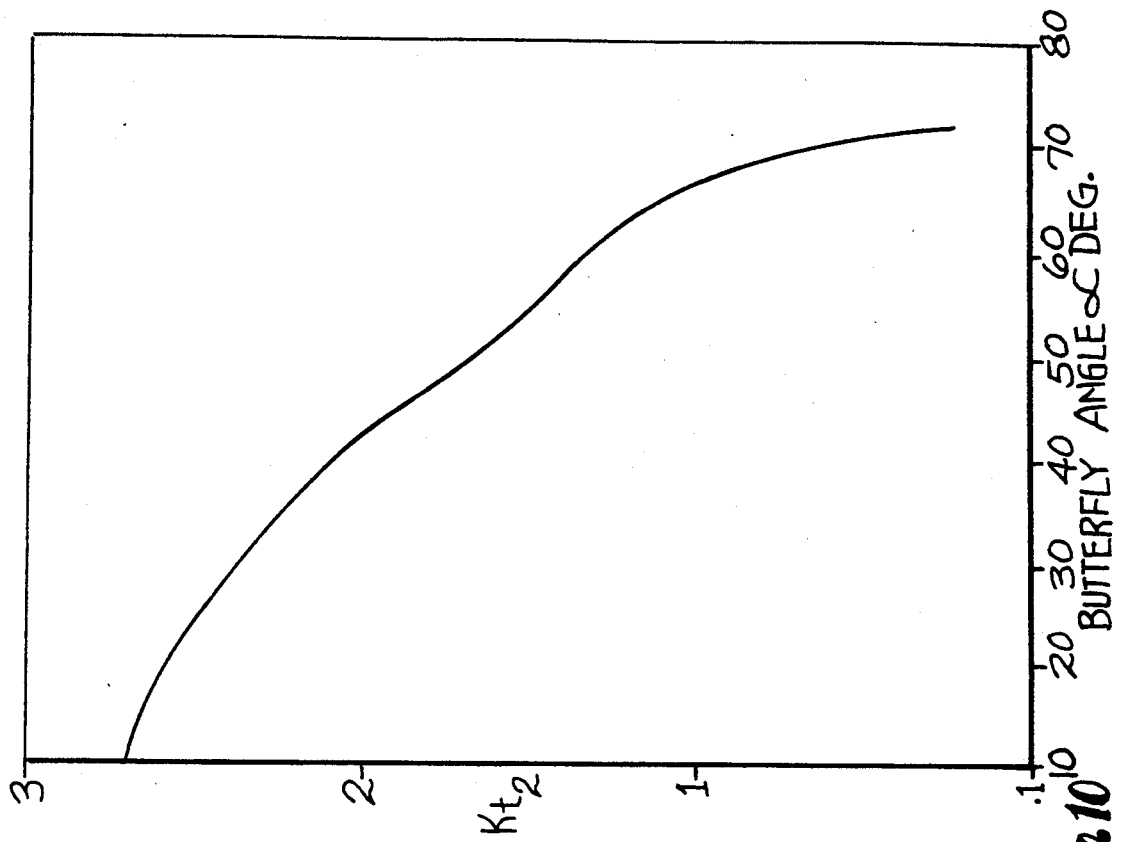
Figure 9:
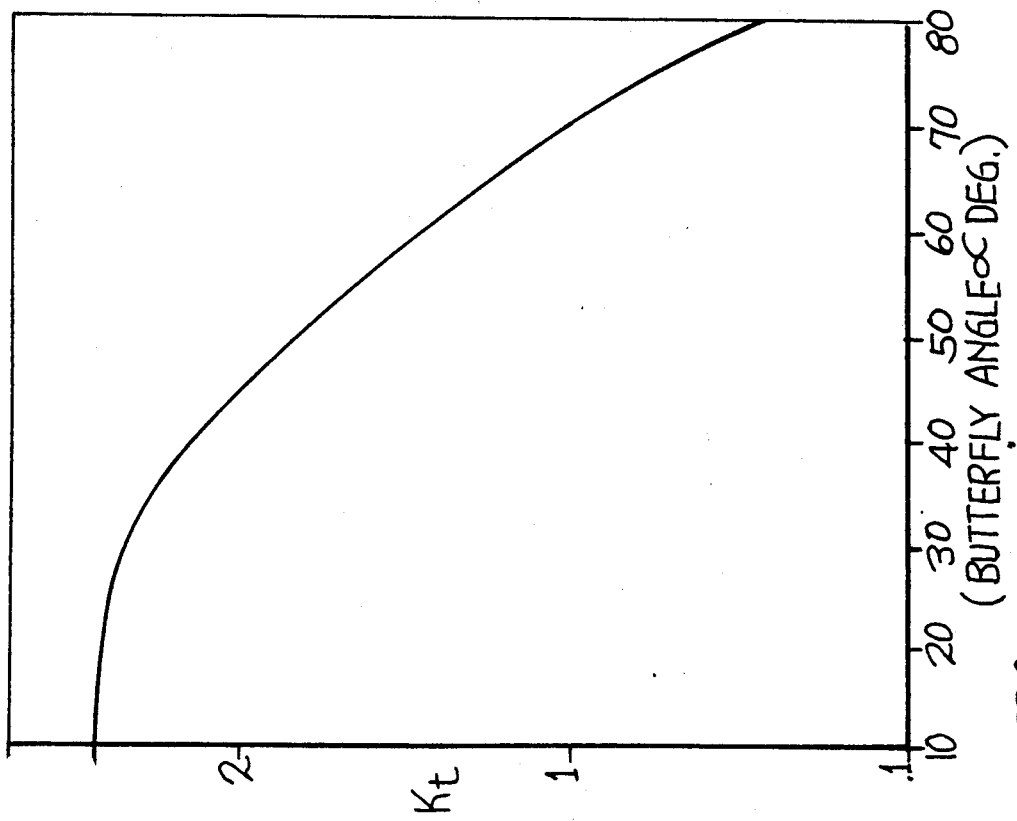
FIG. 9 is a graph showing pressure loss coefficient ($K_t$) versus butterfly valve opening angle (d) in degrees for control of air flow within a first area of the interior of an aircraft (Zone D); and, FIG. 10 is a graph showing pressure loss coefficient ($K_t$) versus butterfly valve opening angle (d) in degrees for control of airflow within a further area of the interior of an aircraft (Zone E).

In tests, the shaft in the linkage mechanism was marked for ten degree increments. Butterfly valve 10 was coupled in the duct to a flow source which provided various flows for the test. For each flow setting, the pressure drop across butterfly valve 10 was recorded for every five degrees from ninety degrees (open valve) to zero degrees (closed valve) from which data FIGS. 9 and 10 were developed showing pressure loss coefficient $K_f$ values for Zones D and E respectively for various flapper angles.

In commercial aircraft, e.g. Boeing model 747-400, Zones D and E can be converted from carrying passengers to carrying cargo. $k_f$ values are used in the air distribution to these zones and are used to reduce airflow in these zones when carrying cargo.

We claim:

1. An air distribution system comprising:
   a duct to distribute air flow;
   a duct mounted butterfly valve for controlling air flow through said duct;
   cable means releasably connected to a locking mechanism that retains said cable means in operative condition for manual adjustment of the position of said butterfly valve by an operator, said locking mechanism pivotably connected to said butterfly valve and coupled to spring means; and
   an electrical solenoid having a pin for releasing said locking mechanism from said cable means upon occurrence of a predetermined condition thereby permitting at least one of spring means and air flow in said duct to close said butterfly valve, wherein said locking mechanism permits direct physical separation of said cable means from said locking mechanism and said butterfly valve thereby terminating any manual control by said operator of said butterfly valve.

2. The invention according to claim 1 wherein rotation of said butterfly valve is limited by the butterfly valve shaft bushing.

3. The invention according to claim 2, wherein said butterfly valve is limited in rotation to 3 degrees from a fully open position.

4. An air distribution system comprising:
   a duct to distribute air flow;
   a duct mounted butterfly valve for controlling air flow through said duct;
   a locking mechanism pivotably connected to said butterfly valve;
   manual controlling means releasably connected to said locking mechanism, said manual controlling means retained by said locking mechanism in operative condition for manual adjustment of the position of said butterfly valve by an operator;
   spring means coupled to said locking mechanism, said spring means biased in one direction when said locking mechanism is in said operative condition; and
   an electrical solenoid having a pin for releasing said locking mechanism from said manual controlling means, thereby terminating any manual control of said butterfly valve by said operator and permitting said at least one of spring means and air flow in said duct to close said butterfly valve, wherein said locking mechanism permits direct physical separation of said manual controlling means from said locking mechanism and said butterfly valve.

* * * * *